United States Patent Office 3,847,983
Patented Nov. 12, 1974

3,847,983
NAPHTHANILIDE DERIVATIVES AND PROCESS FOR PRODUCING THE SAME
Teruo Kobayashi and Taiichi Nishimura, Kanagawa, Japan, assignors to Fuji Photo Film Co., Ltd., Kanagawa, Japan
No Drawing. Filed Oct. 5, 1972, Ser. No. 295,328
Claims priority, application Japan, Oct. 8, 1971, 46/79,187
Int. Cl. C07c 103/26
U.S. Cl. 260—560                                    4 Claims

ABSTRACT OF THE DISCLOSURE

A 2-hydroxy-3-naphthanilide represented by general formula (II):

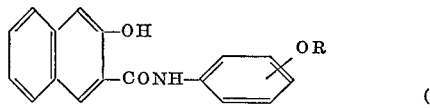

(II)

and a process for preparing the 2-hydroxy-3-naphthanilide of the formula (II) which comprises condensing the aniline derivative represented by general formula (I):

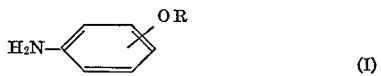

(I)

with 2-hydroxy-3-naphthoic acid. R is defined in the specification.

BACKGROUND OF THE INVENTION

1. Field of the Invention

The present invention relates to novel naphthanilide derivatives and to a process for producing the same.

2. Description of the Prior Art

Heretofore, diazo photographic materials utilizing diazo compounds have been widely used as copying materials for literature or documents and as printing materials.

A component capable of reacting with a diazo compound to form a dye is required in such materials. Such a component is an organic compound referred to as a coupler. As such couplers, there are known a number of compounds, which are summarized in "Light-sensitive Systems: Chemistry and Application of Non-silver Halide Photographic Processes" written by Kosar. As described therein, naphthoic acid derivatives are included as one group of couplers. However, only a few compounds described in the above-described publication or in a few issued patents as naphthoic acid derivatives have so far been found.

SUMMARY OF THE INVENTION

As a result of extensive investigations regarding naphthoic acid derivatives, the inventors have found many novel compounds and a process for synthesizing the same, and have thus achieved the present invention.

Specifically, the present invention relates to novel 2-hydroxy-3-naphthanilide derivatives represented by the following general formula (II), and a process for preparing the same which comprises condensing an aniline derivative represented by the following general formula (I) with 2-hydroxy-3-naphthoic acid;

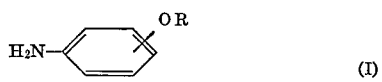

(I)

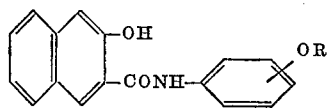

(II)

In the above-illustrated general formulae (I) and (II), R represents one substituent selected from the group consisting of acetyl, propionoyl, benzenesulfonyl, p-toluenesulfonyl (at the o- or m-position), benzyl and benzoyl groups.

DETAILED DESCRIPTION OF THE INVENTION

As described above, the aniline derivative used in the invention is the compound having the general formula (I). Such a material can be synthesized, for example, by reacting nitrophenol with an acid anhydride or acid chloride and then reducing the nitro group, or by the process described in Chemische Berichite Vol. 59, 848 (1926), which comprises treating, with acetic anhydride, benzylidene-p-aminophenol obtained by the dehydration condensation between p-aminophenol and benzaldehyde, to thereby oxidize this material, and then treating the product with sulfuric acid.

As examples of the aniline derivatives within general formula (I), there are:

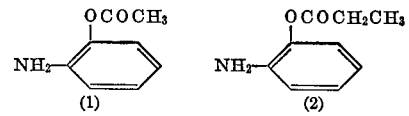 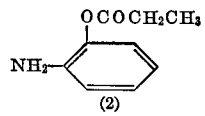

(1)                        (2)

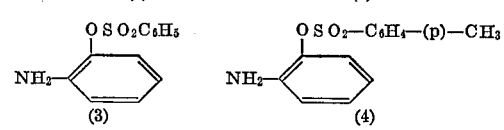 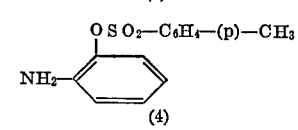

(3)                        (4)

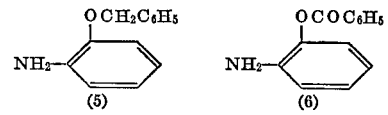 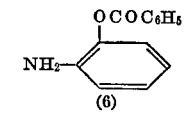

(5)                        (6)

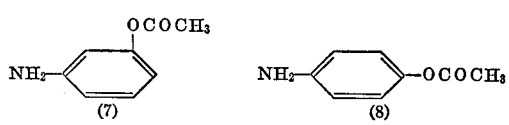 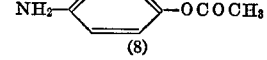

(7)                        (8)

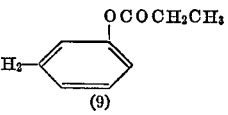 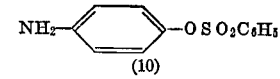

(9)                        (10)

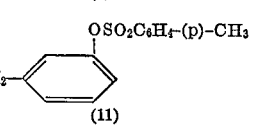 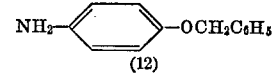

(11)                       (12)

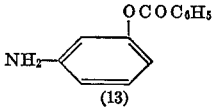

and 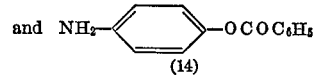
(13)                       (14)

In the process of the invention, these aniline derivatives are condensed with 2-hydroxy-3-naphthoic acid. The condensation may be effected by converting 2-hydroxy-3-naphthoic acid to its acid chloride with thionyl chloride and, after isolating the acid chloride product, condensing the purified product with the aniline derivative. Alternatively, the process may be effected in one step by condensing the aniline derivative with 2-hydroxy-3-naphthoic acid in the presence of phosphorus oxychloride, phosphorus trichloride, phosphorus pentachloride or like compounds (in this case, the acid chloride is considered to be formed as an intermediate stage). If desired, 2-hydroxy-3-naphthoic acid is first converted to its alkyl ester, e.g., ethyl ester, by any conventional procedure, and the resulting ester can then be condensed with the aniline derivative as described above. However, this reaction route is less preferred because of its low reaction efficiency.

In the process of condensing 2-hydroxy-3-naphthoyl chloride with the aniline derivative after once isolating the former, 2-hydroxy-3-naphthoic acid is first heated under reflux with thionyl chloride in a solvent such as a halogenated hydrocarbon, e.g., carbon tetrachloride, chloroform, dichloroethane, methylene chloride, trichloroethylene or the like, to convert 2-hydroxy-3-naphthoic acid to 2-hydroxy-3-naphthoyl chloride. Thionyl chloride can be used in an amount of from 1 to 3 moles per 1 mole of 2-hydroxy-3-naphthoic acid. The solvent may be used in an amount of from 500 ml. to 2000 ml. per 100 g. of the naphthoic acid. The chloride is then added to the aniline derivative solution in a solvent such as benzene, toluene, xylene, acetanilide, pyridine or the like while heating and stirring. The molar ratio of 2-hydroxy-3-naphthoyl chloride to aniline derivative can usually range from 1:1.5 to 1.5:1, and the solvent may be used in an amount of from 200 ml. to 2000 ml. per 100 g. of 2-hydroxy-3-naphthoyl chloride.

Alternatively, 2-hydroxy-3-naphthoyl chloride thus obtained may previously be admixed with the aniline derivative and the admixture heated to react. Additionally, in these reactions, tertiary amines such as triethylamine, pyridine, etc. may be used as a dehydrochlorinating agent.

In addition, where the aniline derivative is condensed with 2-hydroxy-3-naphthoic acid in one step in the presence of phosphorus trichloride or the like, for example, such a condensation is conducted so that sodium 2-hydroxy-3-naphthoate (prepared from 2-hydroxy-3-naphthoic acid and sodium hydroxide) and the aniline derivative are dissolved in toluene or a like solvent and subsequently phosphorus trichloride (or phosphorus oxychloride, phosphorus pentachloride, etc.) is added thereto followed by heating under reflux.

Certain preferred conditions also exist for the one step condensation, i.e., preferably the molar ratio of the naphthoic acid, which is preferably in the salt form, to the aniline derivative is from about 1 to 0.8–1.2 and the molar ratio of the naphthoic acid, again preferably in the salt form, to the phosphorus trichloride (or oxychloride etc.) is from about 1:0.5–2. Values both above and below these ranges can be used by appropriate modification of the reaction conditions, however.

The amount of solvent is non-critical, so long as sufficient solvent is present to serve the solvating function.

Other equivalent salt forms may also be used, of course, for example the potassium salt etc., and such can be determined by one skilled in the art based upon the present specification.

In the above two alternative procedures, the condensation reaction is preferably carried out at the refluxing temperature of the solvent used, but the reaction may be conducted at a temperature below the refluxing temperature. No pressurized condition will generally be required for the condensation reaction. The reaction time varies depending upon the reaction temperature used, but it usually can range from 2 to 6 hours.

The purified end product can be obtained by treating the condensation reaction product thus obtained in a conventional manner, for example, by treating the crude product with activated carbon followed by recrystallization from an appropriate solvent such as dioxane, isopropanol and the like. The same solvent as that used in the condensation is preferably used as a recrystallization solvent.

It is to be understood that the —OR group of the aniline derivative is retained unchanged in the condensation product of this invention as evidenced by analysis of the purified product.

The naphthanilide derivative obtained by the present invention can shift the wavelength region of absorption of the dye formed by the coupling reaction thereof with a light-sensitive diazonium compound to a longer wavelength side than conventional dyes. Therefore, particularly when the coupler of the invention is used in a light-sensitive material wherein it is intended to obtain black images by using a blue dye-forming coupler and a yellow dye-forming coupler, black images can be attained with ease over a wide density region. Furthermore, the coupler obtained in accordance with this invention has the advantage that it has a high solubility, and there can be obtained a dye excellent in light resistance and heat resistance. These advantages are particularly remarkable in the o-substituted compounds.

As previously described, the p-toluenesulfonyl group as the substituent R can be at the 2- or 3-position of the anilide moiety of the 2-hydroxy-3-naphthanilide derivative (II). It has been found that the corresponding 4-p-toluenesulfonyloxy compound which is a known compound does not give a sufficient blue density when it is used as a diazo coupler because of its lower solubility in methanol than that of the corresponding 2- or 3-p-toluenesulfonyloxy compound, as shown in Table below.

Solubility of 2-hydroxy-(p-toluenesulfonyloxy-substituted)-3-napthanilide

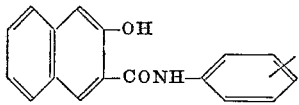

| Position of p-Toluene-sulfonyloxy Group: | Solubility in Methanol (mg./100 ml., at 25° C.) |
| --- | --- |
| 2 | 765 |
| 3 | 146 |
| 4 | 28 |

Now, the present invention will be described in greater detail hereinafter by reference to several examples which should not be taken as limitative of the invention.

EXAMPLE 1

(Synthesis of 2-hydroxy-2'-benzyloxy-3-naphthanilide)

(1) Synthesis of 2-hydroxy-3-naphthoyl chloride.—140 Grams (0.75 mole) of 2-hydroxy-3-naphthoic acid was placed in a 2-liter flask and refluxed for 4 hours together with 1 liter of carbon tetrachloride, 3 drops of dimethylformamide and 100 g. (0.84 mole) of thionyl chloride. After the completion of the reaction, the contents were concentrated to crystallize the chloride. By filtration, there was obtained 120 g. of end product 2-hydroxy-3-naphthoyl chloride.

(2) Synthesis of 2-hydroxy-2'-benzyloxy-3-naphthanilide.—20 Grams (0.1 mole) of 2-benzyloxyaniline was dissolved in 400 ml. of acetanilide and, under reflux, a solution prepared by dissolving 20.6 g. (0.1 mole) of 2-hydroxy-3-naphthoyl chloride in 400 ml. of dry benzene was added dropwise thereto over 30 minutes, and refluxed for a further 5 hours. After the completion of the reaction, solvent was removed to crystallize and, after filtration, the crystals formed were recrystallized from dioxane. The yield of the crystals was 22 g., and the melting point thereof was 184° C.

Elemental Analysis.—Calcd. for $C_{24}H_{19}NO_3$: C, 78.05; H, 5.15; N, 3.79. Found: C, 77.80; H, 5.20; N, 3.93.

When the compound thus prepared was coupled with 2,5-dibutoxy-4-morpholinobenzenediazonium chloride, there was obtained a bluish violet azo dye (m.p., 201–202° C., a maximum absorption wavelength in a benzene solution of the dye ($\lambda$ Benzene max.) is 585 nm.).

EXAMPLE 2

(Synthesis of 2-hydroxy-3'-p-toluenesulfonyloxy-3-naphthanilide)

70 Grams (0.5 mole) of m-nitrophenol and 28 g. (0.5 mole) of potassium hydroxide were dissolved in 400 ml. of methanol and, under reflux, 200 ml. of a methanol solution containing 95 g. (0.5 mole) of p-toluenesulfonyl chloride was added dropwise thereto and refluxing was continued for a further 3 hours. Thereafter, solvent was removed to obtain 3-p-toluenesulfonyloxynitrobenzene, and subsequently, by a conventional method, 3-p-toluenesulfonyloxyaniline (foregoing compound 11) was obtained. 13.2 Grams (0.05 mole) of the resulting compound was dissolved in 200 ml. of acetonitrile and, after adding dropwise thereto 100 ml. of a benzene solution containing 12 g. of 3-hydroxynaphthoyl chloride under reflux, refluxing was continued for 4 hours. After treating the reaction product in the same manner as in Example 1, crystals formed which were washed with isopropanol. The m.p. was 199–201° C., Yield: 9.2 g.

*Elemental Analysis.*—Calcd. for $C_{24}H_{19}NO_5S$: C, 66.51; H, 4.39; N, 3.23. Found: C, 66.49; H, 4.38; N, 3.12.

When the resulting product was coupled with 4-pyrrolidino-3-methyl-benzenediazonium chloride, there was provided a blue dye.

Further, the acid product was coupled with 2,5 dibutoxy-4-morpholinobenzenediazonium salt to obtain a blue dye (m.p., 187–188° C., λ Benzene max. 596 nm.).

EXAMPLE 3

The procedure of Example 1 was followed using 3-benzyloxyaniline in place of 2-benzyloxyaniline. As a result, there was obtained 2-hydroxy-3'-benzyloxy-3-naphthanilide (m.p. 205–207° C.) as pale yellow crystals. When the resulting compound was coupled with 4-(N-benzyl - N - ethyl)aminobenzenediazonium tetrafluoroborate in the presence of an alkali, there was obtained a blue dye.

EXAMPLE 4

The procedure of Example 1 was followed using 4-benzyloxyaniline in place of 2-benzyloxyaniline to obtain pale yellow crystals of hydroxy-4'-benzyloxy-3-naphthanilide (m.p. 245–248° C.). When the resulting compound was coupled in the same manner as in Example 3, there was also obtained a blue dye.

EXAMPLE 5

Following the procedure of Example 2 except replacing the 3-p-toluenesulfonyloxyaniline by 2-p-toluenesulfonyloxyaniline, there was obtained 2-hydroxy-2'-p-toluenesulfonyloxy-3-naphthaniline (m.p. 179–181° C.) as pale yellow crystals. When the resulting compound was coupled with the diazonium salt used in Example 3, there was obtained a blue dye. Further, the above compound was coupled with 2,5-dibutoxy-4-morpholinobenzenediazonium salt to obtain a blue dye (m.p., 211–212° C, λ Benzene max. 601 nm.).

EXAMPLES 6–17

Condensation reactions with 2-hydroxy-3-naphthoic acid were conducted as in Example 1 except using, as the compound of general formula (I), 2-acetyloxyaniline, 3-acetyloxyaniline, 4-acetyloxyaniline, 2-propionoyloxyaniline, 3-propionoyloxyaniline, 4-propionoyloxyaniline, 2-benzenesulfonyloxyaniline, 3 - benzenesulfonyloxyaniline, 4-benzenesulfonyloxyaniline, 2-benzoyloxyaniline, 3-benzoyloxyaniline and 4-benzoyloxyaniline, to obtain corresponding 2-hydroxy-2'-acetyloxy-3-naphthanilide, 2-hydroxy-3'-acetyloxy-3-naphthanilide (m.p., 181–184° C.), 2-hydroxy-4'-acetyloxy-3-naphthanilide, 2-hydroxy-2'-propionoyloxy-3-naphthanilide, 2-hydroxy-3'-propionoyloxy-3-naphthanilide (m.p., 186–188° C.), 2-hydroxy-4'-propionoyloxy-3-naphthanilide, 2-hydroxy-2'-benzenesulfonyloxy-3-naphthanilide, 2 - hydroxy-3'-benzenesulfonyloxy-3-naphthanilide, 2-hydroxy-4'-benzenesulfonyloxy-3-naphthanilide, 2-hydroxy-2'-benzoyloxy-3-naphthanilide, 2-hydroxy-3'-benzoyloxy-3-naphthanilide (m.p., 179–182° C.) and 2-hydroxy-4'-benzoyloxy-3-naphthanilide, respectively.

As to the color of the resulting crystals, the acetyloxy derivatives and propionoyloxy derivatives were gray, the benzenesulfonyloxy derivatives were light gray, and the benzoyloxy derivatives were pale yellow. The colors of the dyes obtained by a coupling reaction with 4-morpholinobenzenediazonium salt were bluish violet-blue.

In general, those dyes having the deepest color were p-toluenesulfonyloxy derivatives and benzenesulfonyloxy derivatives, which were followed by benzoyloxy derivatives, propionyloxy derivatives and benzyloxy derivatives in that order.

As to the bathochromic shift with respect to the position of the substituent, the 2'-position was the most remarkable and next came the 3'- and 4'-positions, whose bathochromic effects were approximately the same. However, in the case of toluenesulfonyloxy derivatives, the 2'- and 3'- positions were approximately the same in their bathochromic effect, and, for the benzenesulfonyloxy derivatives, the 2'-, 3'- and 4'- positions were approximately the same.

While the invention has been described in detail and with reference to specific embodiments thereof, it will be apparent to one skilled in the art that various changes and modifications can be made therein without departing from the spirit and scope thereof.

What is claimed is:

1. A naphthanilide derivative of the formula:

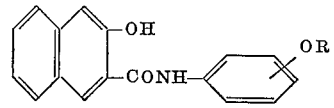

wherein R represents a substituent selected from the group consisting of acetyl, propionoyl, benzenesulfonyl, benzyl and benzoyl groups, and p-toluenesulfonyl at the ortho or meta position.

2. A naphthanilide derivative of claim 1, wherein the —OR group is in the ortho position.

3. A naphthanilide derivative of claim 1, wherein R represents a p-toluenesulfonyl group.

4. A naphthanilide derivative of claim 2, wherein R represents a p-toluenesulfonyl group.

References Cited
UNITED STATES PATENTS

| | | | |
|---|---|---|---|
| 3,585,033 | 6/1971 | Desjarlais | 260—560 |
| 3,404,005 | 10/1968 | Tobey | 260—560 |
| 3,064,049 | 11/1962 | Cox | 260—560 |
| 2,097,915 | 11/1937 | Dahlen | 260—560 |
| 2,029,509 | 2/1936 | Sexton | 260—560 |
| 1,908,976 | 5/1933 | Grether | 260—560 |

HARRY I. MOATZ, Primary Examiner

U.S. Cl. X.R.

260—204, 152, 192, 196, 456 A, 476 C, 479 R